US010225457B1

(12) United States Patent
Freerksen et al.

(10) Patent No.: US 10,225,457 B1
(45) Date of Patent: Mar. 5, 2019

(54) STABILIZING OPERATION OF A HIGH SPEED VARIABLE FOCAL LENGTH TUNABLE ACOUSTIC GRADIENT LENS IN AN IMAGING SYSTEM

(71) Applicant: Mitutoyo Corporation, Kanagawa-ken (JP)

(72) Inventors: Isaiah Freerksen, Bothell, WA (US); Paul Gerard Gladnick, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 15/696,680

(22) Filed: Sep. 6, 2017

(51) Int. Cl.
*H04N 5/232* (2006.01)
*H04N 5/235* (2006.01)
*G02F 1/29* (2006.01)

(52) U.S. Cl.
CPC ......... *H04N 5/23212* (2013.01); *G02F 1/29* (2013.01); *H04N 5/2352* (2013.01); *H04N 5/23245* (2013.01); *G02F 2001/291* (2013.01); *G02F 2203/18* (2013.01)

(58) Field of Classification Search
CPC ......... H04N 5/23212; H04N 5/23245; H04N 5/2352; G02F 1/29; G02F 2001/291; G02F 2203/18
See application file for complete search history.

(56) References Cited

U.S. PATENT DOCUMENTS

| | | | |
|---|---|---|---|
| 6,542,180 B1 | 4/2003 | Wasserman et al. | |
| 7,324,682 B2 | 1/2008 | Wasserman | |
| 7,454,053 B2 | 11/2008 | Bryll et al. | |
| 8,111,905 B2 | 2/2012 | Campbell | |
| 8,111,938 B2 | 2/2012 | Bryll et al. | |
| 9,143,674 B2 | 9/2015 | Gladnick | |
| 9,736,355 B1 | 8/2017 | Bryll | |
| 2013/0063805 A1* | 3/2013 | Arnold | G02B 3/14 359/311 |

(Continued)

OTHER PUBLICATIONS

Duocastella et al., "Simultaneous imaging of multiple focal planes for three-dimensional microscopy using ultra-high-speed adaptive optics," *J. Biomed. Opt.* 17(5): 050505-1-050505-3, 2012. (4 pages).

(Continued)

*Primary Examiner* — Shahbaz Nazrul
(74) *Attorney, Agent, or Firm* — Seed IP Law Group LLP (57) ABSTRACT

A method is provided for operating an imaging system to maintain a tunable acoustic gradient (TAG) lens at a desired operating state. In a first step, the TAG lens operates using a standard imaging drive control configuration (e.g., a standard drive voltage and duration) during a plurality of imaging drive mode time periods, to achieve a standard imaging state of the TAG lens. In a second step, the TAG lens operates using a regulating adaptive drive control configuration during a plurality of regulating adaptive drive mode time periods, wherein at least one of a different respective TAG lens drive voltage and a different respective TAG lens drive duration is used for different respective regulating adaptive drive mode time periods, based on a monitoring signal that is indicative of a difference between the standard imaging state and a current operating state of the TAG lens.

20 Claims, 7 Drawing Sheets

(56) References Cited

U.S. PATENT DOCUMENTS

| | | | |
|---|---|---|---|
| 2013/0148196 A1* | 6/2013 | Arnold | G02B 21/025 |
| | | | 359/385 |
| 2015/0042992 A1* | 2/2015 | Cui | G02B 21/002 |
| | | | 356/369 |
| 2017/0061601 A1 | 3/2017 | Bryll | |
| 2017/0078549 A1* | 3/2017 | Emtman | G02B 21/367 |

OTHER PUBLICATIONS

Mermillod-Blondin et al., "High-speed varifocal imaging with a tunable acoustic gradient index of refraction lens," *Opt. Lett.* 33(18): 2146-2148, 2008.

"QVPAK 3D CNC Vision Measuring Machine: Operation Guide," Version 2.0, Manual No. 4911GB, Series No. 359, $1^{st}$ Ed., Mitutoyo Corporation & Micro Encoder Inc., Sep. 1996, 86 pages.

"QVPAK 3D CNC Vision Measuring Machine: User's Guide," Version 7.0, Manual No. 99MCB225A, Series No. 359, 1st ed., Mitutoyo Corporation & Micro Encoder Inc., Jan. 2003, 329 pages.

Extended European Search Report, dated Dec. 7, 2018, for European Application No. 18192727.8-1209, 8 pages.

\* cited by examiner

STABILIZING OPERATION OF A HIGH SPEED VARIABLE FOCAL LENGTH TUNABLE ACOUSTIC GRADIENT LENS IN AN IMAGING SYSTEM

BACKGROUND

Technical Field

This disclosure relates to precision metrology using a high speed variable focal length lens (e.g., in a machine vision inspection system) and, more particularly, to monitoring and stabilizing operation of a high speed variable focal length lens in an imaging system.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in its entirety. This type of system uses a microscope-type optical system and moves the stage so as to provide inspection images of either small or relatively large workpieces.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

Multi-lens variable focal length (VFL) optical systems may be utilized in an imaging system for observation and precision measurement of surface heights. The imaging system may be included in a microscope system and/or in a precision machine vision inspection system, for example as disclosed in U.S. Pat. No. 9,143,674, which is hereby incorporated herein by reference in its entirety. Briefly, a VFL lens is capable of acquiring multiple images at multiple focal lengths, respectively. As one type of VFL lens, tunable acoustic gradient ("TAG") lenses are known. A TAG lens is a high speed VFL lens that creates a lensing effect using sound waves in a fluid medium. The sound waves may be created by application of an electrical field at a resonant frequency to a piezoelectric tube surrounding the fluid medium. The sound waves create a time-varying density and index of refraction profile in the lens' fluid, which modulates its optical power and focal length or focus position. A TAG lens may periodically sweep a range of focal lengths at a resonant frequency of up to several hundred kHz, i.e., at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 kHz.

Various embodiments of the present invention are directed to improving operation of an imaging system that incorporates a TAG lens as a VFL lens.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An imaging system utilizing a TAG lens may be calibrated for its focal length or position as a function of phase timing during its resonant cycle, using known operating conditions for the calibration, e.g., while using a particular drive amplitude at a particular resonant frequency. During calibration, stable environmental conditions may be provided to ensure that the desired operating conditions are stable and known throughout the calibration data acquisition. After calibration, for a surface that produces a best-focused image when exposed using a particular phase timing, the calibration data may be used to indicate the focal position of that surface relative to the imaging system, which provides a measurement of its position or height. In operation, however, the operating conditions of a TAG lens may drift due to various factors, and may fail to precisely match the operating conditions used for calibration. This may result in small, but non-negligible, measurement errors. It is known that the resonant frequency of a TAG lens will slightly vary as a function of the lens temperature, for example. This reflects a change in the electro-mechanical response of the lens to the drive signal. It is also known that a change in the temperature of the lens fluid changes its nominal refractive index. Any such change in the electro-mechanical response of the lens and/or its fluid properties necessarily changes the optical power (or focal length) response of the lens to the drive signal, resulting in the aforementioned measurement errors. A need exists for techniques that facilitate stabilizing operation of a TAG lens (e.g., including its operating temperature), which will stabilize the operation of an imaging system including a TAG lens and allow the reduction or elimination of the aforementioned measurement errors.

According to exemplary embodiments, a method is provided for operating an imaging system including a tunable acoustic gradient (TAG) lens, a TAG lens controller, a camera, and an exposure time controller, in order to establish or maintain the TAG lens at a desired (standard) operating state for imaging. The method includes generally two steps. In a first step, the TAG lens is controlled using a standard imaging drive control configuration during a plurality of imaging drive mode time periods. Each instance of the imaging drive mode time period provides image data acquired while operating the TAG lens according to the standard imaging drive control configuration. The standard imaging drive control configuration includes a standard imaging drive voltage and a standard imaging drive duration, and is configured to achieve a standard imaging state of the TAG lens (e.g., a state that corresponds to the conditions used as the basis for calibration data). In a second step, the TAG lens is controlled using a regulating adaptive drive control configuration during a plurality of regulating adaptive drive mode time periods that are different than the imaging drive mode time periods. The regulating adaptive drive control configuration is configured to provide at least one of a different respective TAG lens regulating drive voltage and a different respective TAG lens regulating drive duration for different respective regulating adaptive drive mode time periods, based on a TAG lens monitoring signal that is indicative of a difference between the standard imaging state of the TAG lens and a current operating state of the TAG lens.

According to further implementations, an imaging system is provided including a camera, an exposure time controller configured to control image data acquisition by the camera, a tunable acoustic gradient (TAG) lens, and a TAG lens controller. The TAG lens controller is configured to control the TAG lens using a standard imaging drive control configuration during a plurality of imaging drive mode time periods, and to control the TAG lens using a regulating adaptive drive control configuration during a plurality of regulating adaptive drive mode time periods that are different than the imaging drive mode time periods, as described above.

The method and imaging system according to various embodiments are therefore capable of monitoring and stabilizing operation of a TAG lens and stabilizing operation of the imaging system that incorporates the TAG lens, during ongoing operation.

DETAILED DESCRIPTION

Figure 1:
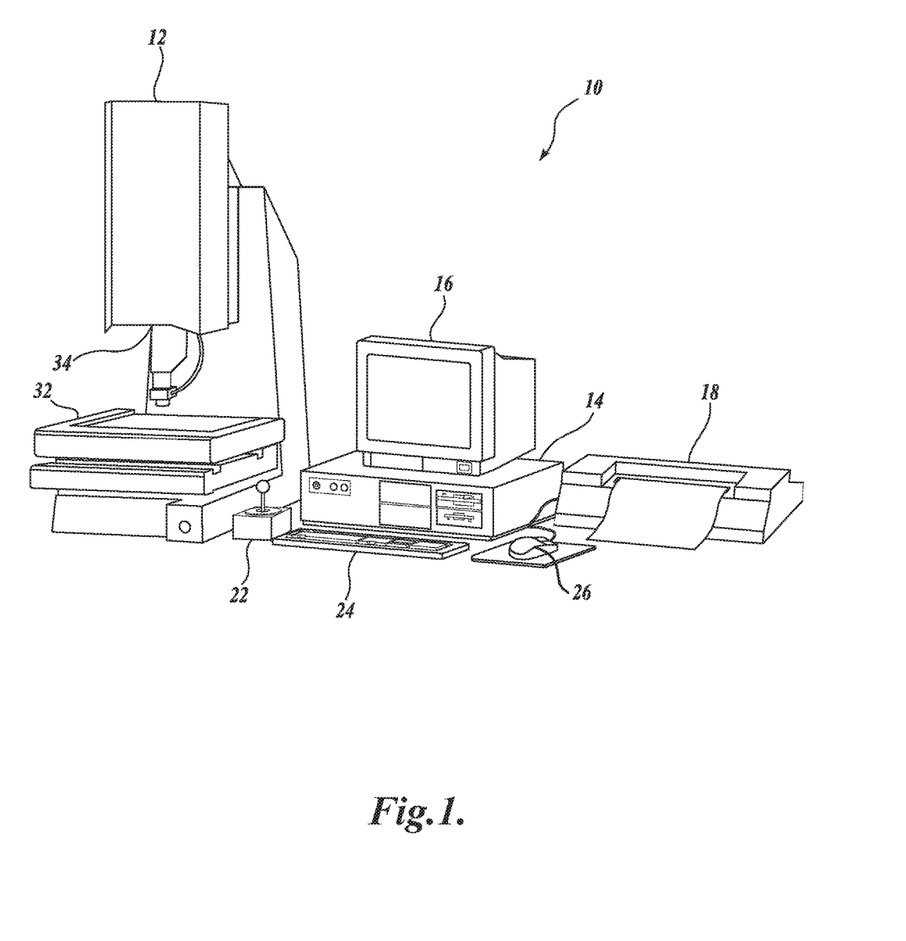
FIG. 1 is a diagram showing various typical components of a general-purpose precision machine vision inspection system.

FIG. 1 is a block diagram of one exemplary machine vision inspection system 10 usable as an imaging system in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touchscreen tablet or the like may be substituted for and/or redundantly provide the functions of any or all of the computer system 14, the display 16, the joystick 22, the keyboard 24, and the mouse 26.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of nonvolatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is also described in commonly assigned U.S. Pat. Nos. 7,454,053; 7,324,682; 8,111,905; and 8,111,938, each of which is hereby incorporated herein by reference in its entirety.

Figure 2:
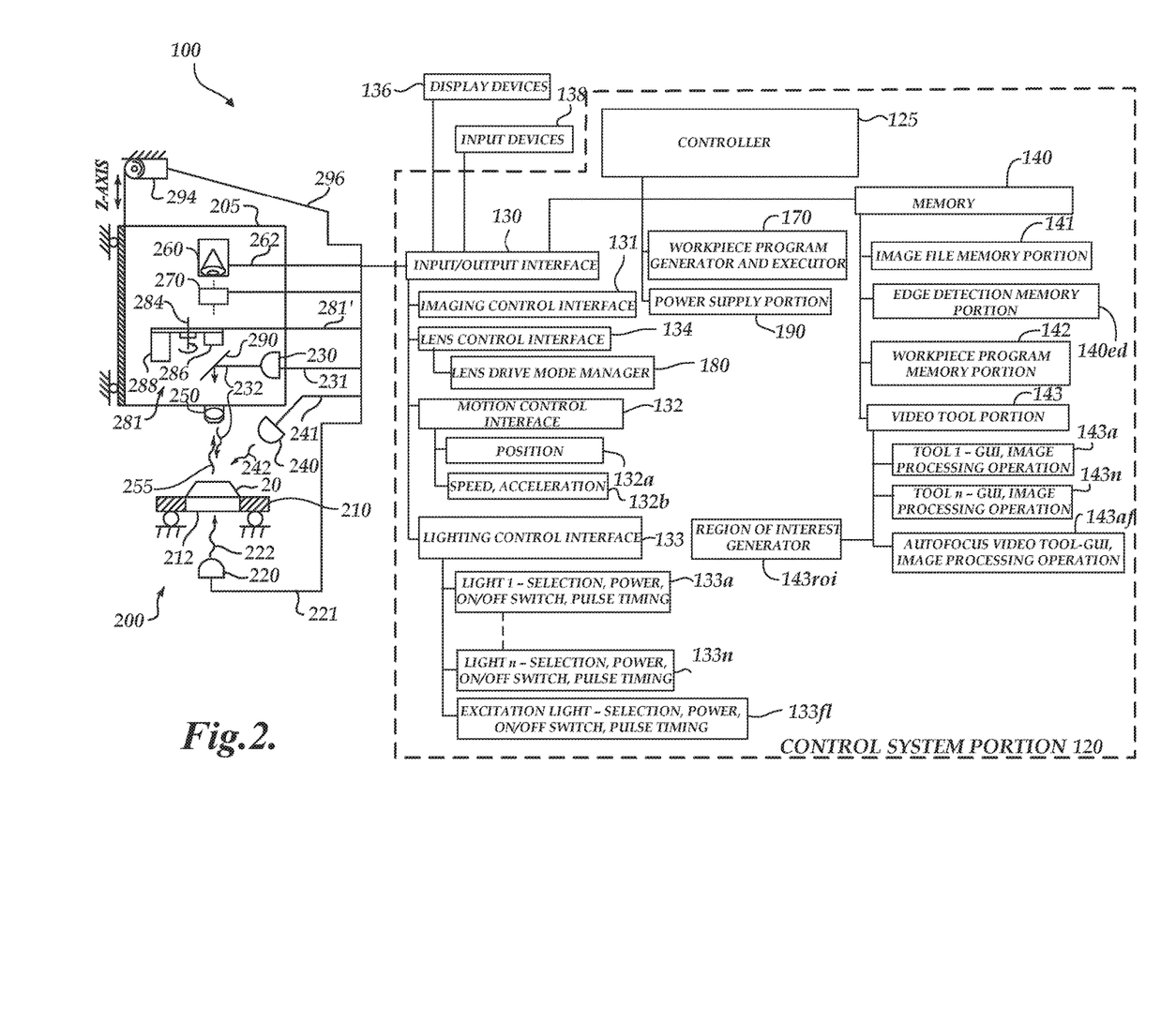
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260, an interchangeable objective lens 250, a variable focal length (VFL) lens 270 which is a TAG lens in various exemplary embodiments, and may include a turret lens assembly 281 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. As will be described in more detail below, the VFL (TAG) lens 270 may be controlled via a signal line 334' by a lens control interface 134 to periodically modulate a focus position of the lens. The lens control interface 134 may include a lens drive mode manager 180 according to various principles disclosed herein, as described in greater detail below. A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light used for imaging passes through the interchangeable objective lens 250, the turret lens assembly 281 and the VFL lens 270, and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. The control system portion 120 may rotate the turret lens assembly 281 along axis 284 to select a turret lens through a signal line or bus 281' to alter an image magnification.

Figure 3:
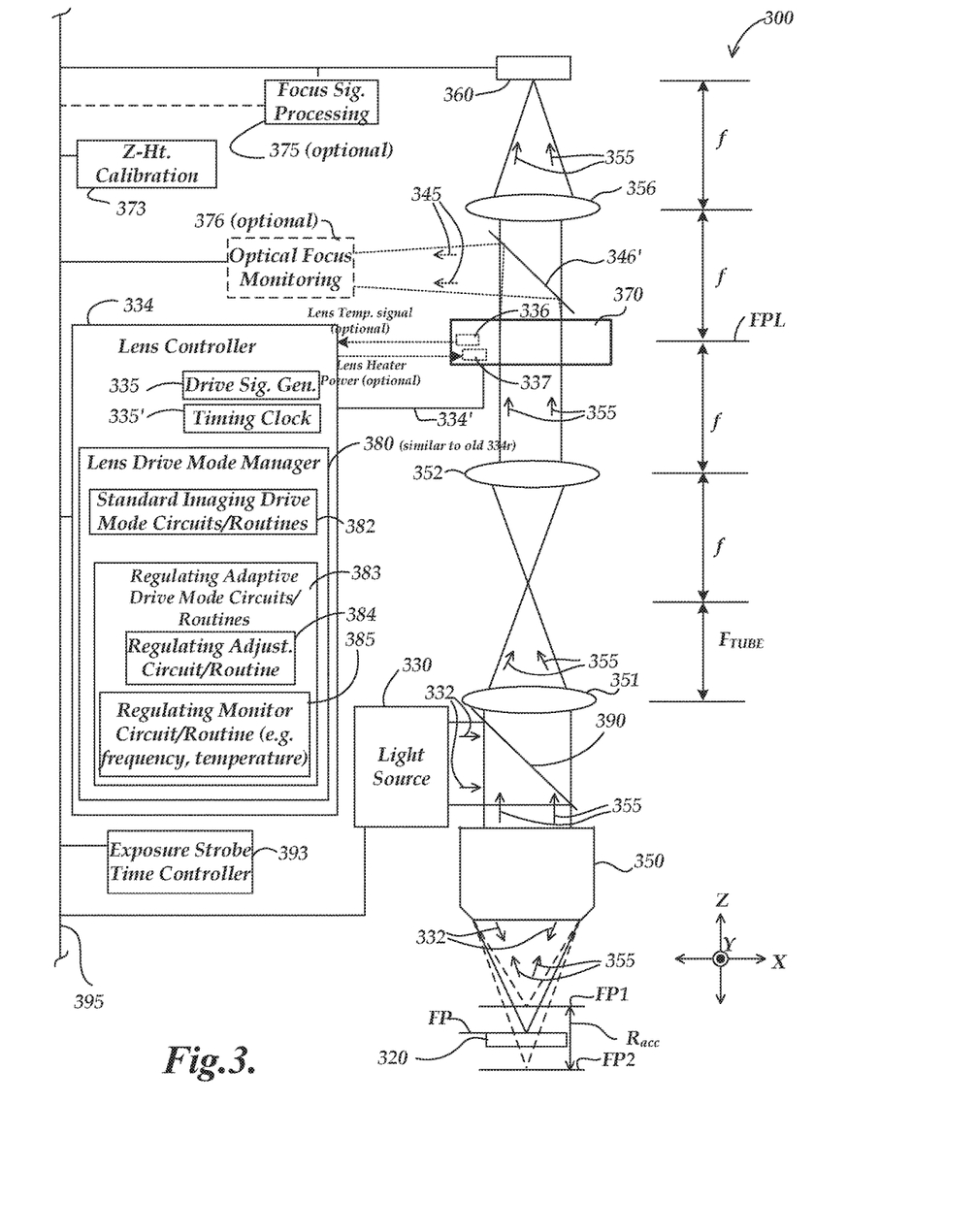
FIG. 3 is a schematic diagram of an imaging system that may be adapted to a precision non-contact metrology system such as a machine vision inspection system and operated according to the principles disclosed herein.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 may include the lens drive mode manager 180 including a lens operating circuit and/or routine to control the drive mode of the TAG lens 270 according to principles disclosed herein, and/or as described in greater detail below with reference to a lens controller 334 comprising circuitry and/or routines as shown in FIG. 3. In some embodiments, the lens control interface 134 and the lens controller 334 may be merged and/or indistinguishable. The motion control interface 132 may include a position control element 132a, and a speed/acceleration control element 132b, although such elements may be merged and/or indistinguishable. The lighting control interface 133 may include lighting control elements 133a, 133n, and 133fl that control, for example, the selection, power, on/off switch, and strobe pulse timing, if applicable, for the various corresponding light sources of the machine vision inspection system 100. The lighting control element configured to control strobe pulse timing generally corresponds to an exposure (strobe) time controller 393 as shown in FIG. 3, described in greater detail below.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools; and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed using hardware described in FIG. 3, as described in more detail in U.S. Pat. No. 9,143, 674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool.

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool, with the underlying operations being included implicitly.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features (e.g., as associated with the autofocus video tool 143af, etc.).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

FIG. 3 is a schematic diagram of a VFL lens system 300 (also referred to as imaging system 300) that includes a TAG lens 370 and may be adapted to a vision system and operated according to the principles disclosed herein. It will be appreciated that certain numbered components 3XX of FIG. 3 may correspond to and/or have similar operations as similarly numbered components 2XX of FIG. 2, except as otherwise described below. As shown in FIG. 3, the VFL lens system 300 includes a light source 330, an objective lens 350, a tube lens 351, a relay lens 352, a VFL (TAG) lens 370, a relay lens 356, a lens controller 334, a camera/detector 360, a Z-height (focus distance) calibration portion 373, a focus signal processing portion 375 (optional), and an optical focus monitoring portion 376 (optional). In various implementations, the various components may be interconnected by direct connections or one or more data/control busses (e.g., a system signal and control bus 395) and/or application programming interfaces.

In operation, in the implementation shown in FIG. 3, the light source 330 may be a "coaxial" or other light source configured to emit source light 332 (e.g., with strobed or continuous illumination) along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. The tube lens 351 receives the workpiece light 355 and outputs it to the relay lens 352. In other implementations, analogous light sources may illuminate the field of view in a non-coaxial manner; for example a ring light source may illuminate the field of view. In various implementations, the objective lens 350 may be an interchangeable objective lens and the tube lens 351 may be included as part of a turret lens assembly (e.g., similar to the interchangeable objective lens 250 and the turret lens assembly 281 of FIG. 2). In various implementations, any of the other lenses referenced herein may be formed from or operate in conjunction with individual lenses, compound lenses, etc.

The relay lens 352 receives the workpiece light 355 and outputs it to the VFL (TAG) lens 370. The VFL (TAG) lens 370 receives the workpiece light 355 and outputs it to the relay lens 356. The relay lens 356 receives the workpiece light 355 and outputs it to the camera/detector 360. In various implementations, the camera/detector 360 may capture an image of the workpiece 320 during an image exposure period, and may provide the image data to a control system portion.

In the example of FIG. 3, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the VFL (TAG) lens 370 (e.g., which may be a low numerical aperture (NA) device) at the Fourier plane of the objective lens 350. This configuration may maintain the telecentricity at the workpiece 320 and may minimize scale change and image distortion (e.g., including providing constant magnification for each Z-height of the workpiece 320 and/or focus position FP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL (TAG) lens 370, so as to minimize image aberrations, etc.

In various implementations, the lens controller 334 may include a drive signal generator portion 335. The drive signal generator portion 335 may operate (e.g., in conjunction with a timing clock 335') to provide a periodic drive signal to the high speed VFL (TAG) lens 370 via a signal line 334'. In various implementations, the drive signal generator may include a known type of circuit that automatically seeks or follows any changes in the peak resonant frequency. In such an implementation, a known type of circuit (e.g., a clock counting circuit gated by the periodic drive signal zero crossings) may output an indication of the actual resonant frequency of the TAG lens in near real time, which may be used as a TAG lens monitoring signal in some implementations, as outlined in greater detail below.

In various implementations, the lens controller 334 may monitor an operating state of the TAG lens 370 and stabilize operation of the TAG lens 370 based on a monitoring signal. As previously described in the summary section, an imaging system incorporating a TAG lens is typically calibrated under stable conditions, with lens' operational parameters remaining constant, at desired standard operating conditions. It is therefore desirable to stabilize operation of the TAG lens by establishing and maintaining these parameters at the same desired (standard) values during normal operation, in order to minimize measurement errors that may otherwise arise at non-standard operating conditions. More specifically, in some implementations it is desirable to stabilize the lens' operational parameters, such as a resonant frequency and/or an operational temperature of the lens during ongoing operation of the lens. By monitoring and stabilizing any of these operational parameters of the TAG lens, various embodiments of the invention ensure proper operation of the imaging system incorporating the TAG lens in accordance with its initial calibration.

Figure 4:
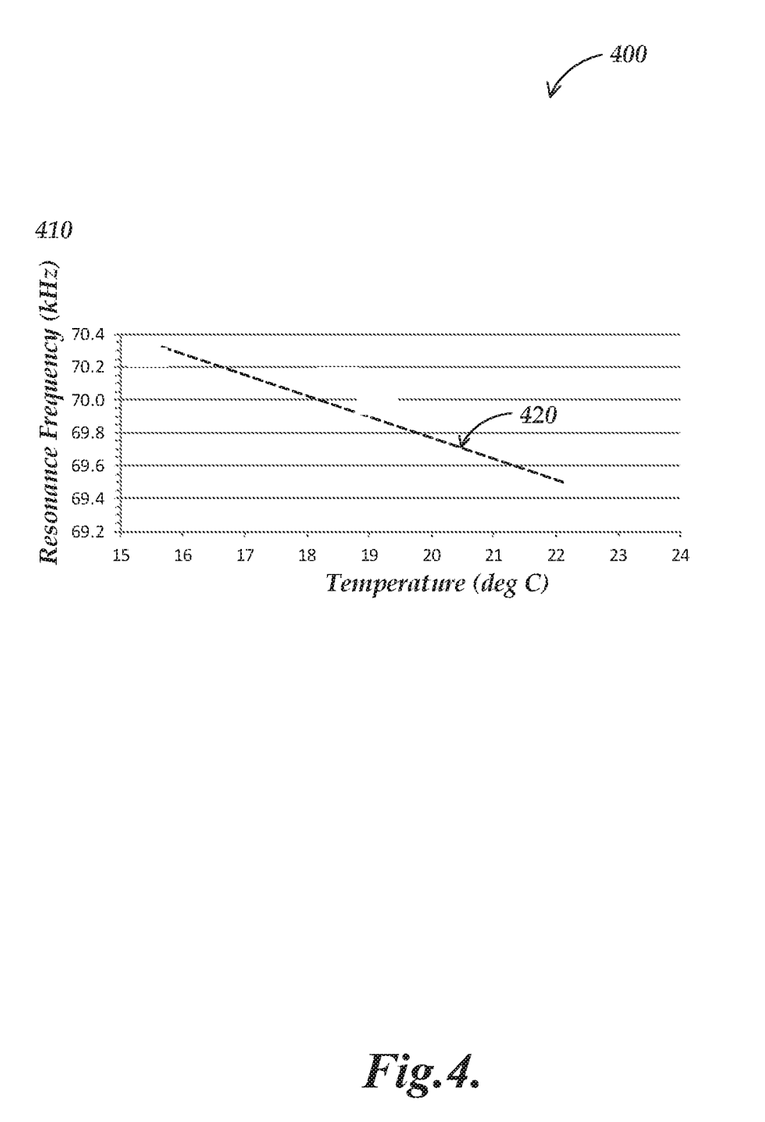
FIG. 4 is a diagram of a graph illustrating resonant frequencies of a VFL (TAG) lens at various operating temperatures.

The operational parameters of a TAG lens to be monitored and stabilized may be, for example, a resonant frequency of the TAG lens 370, a temperature associated with the TAG lens 370 such as the operational temperature of the TAG lens 370 itself or a temperature of a component proximate to the TAG lens 370, or any other meaningful operational attribute of the TAG lens 370. Of the operational parameters, a resonant frequency of a TAG lens is generally correlated with, and a sensitive indicator of, an operating temperature of the TAG lens, as shown in FIG. 4. FIG. 4 is a diagram of a graph 400 illustrating resonant frequencies of a TAG lens at various operating temperatures. The graph 400 shows a set of measured resonant frequencies 410 of a TAG lens (in kHz) as a function of temperature (in degrees C.), expressed as a linear fit 420. The linear fit 420 has a slope of approximately −130 Hz/degree C. Thus, monitoring and stabilizing an operational temperature of a TAG lens facilitates correspondingly stabilizing the resonant frequency of the TAG lens, and vice versa.

Figure 5:
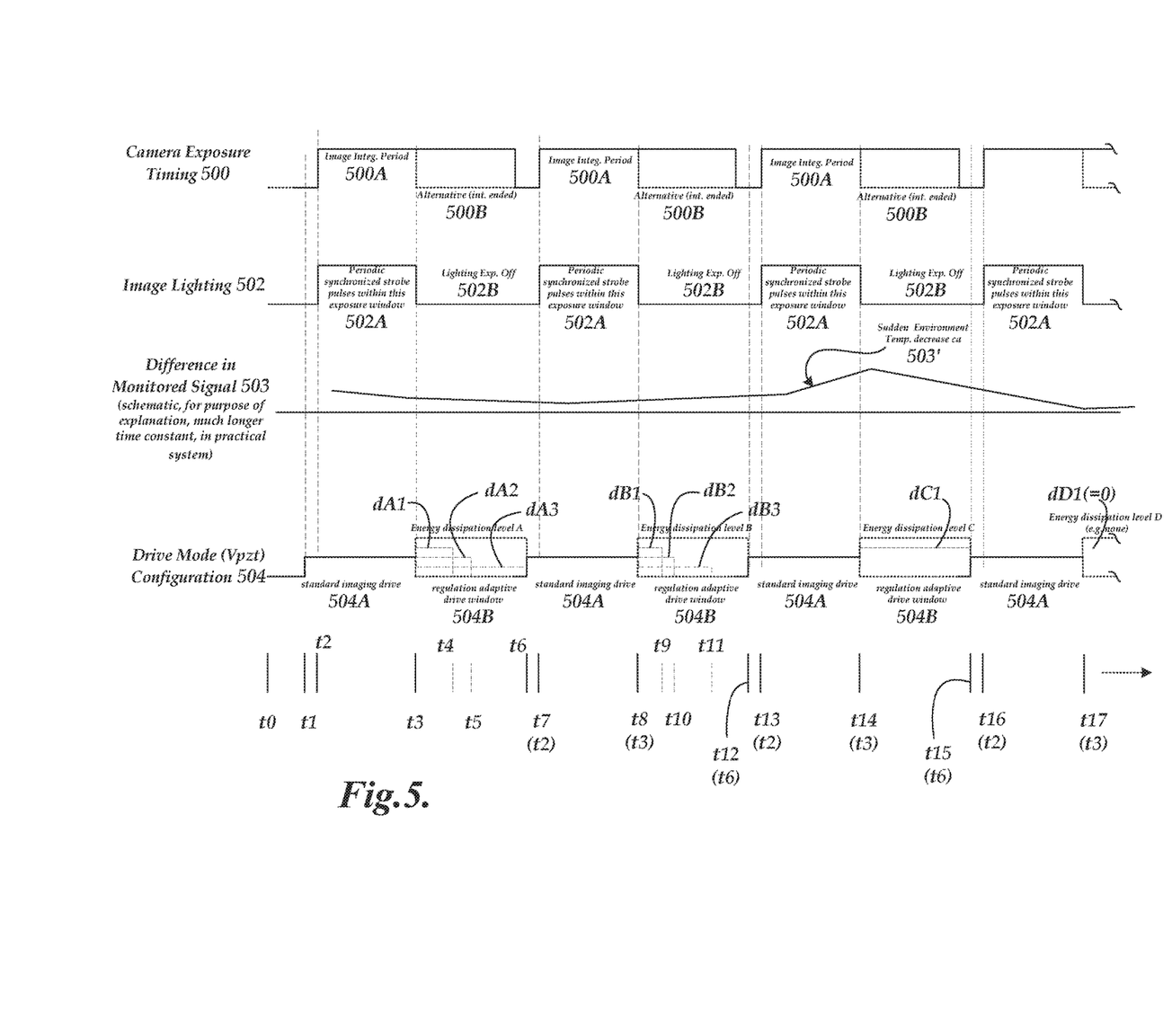
FIG. 5 is a timing chart illustrating one exemplary operation of an imaging system including a TAG lens.

Referring back to FIG. 3, in various implementations, the lens controller 334 may include a lens drive mode manager 380 comprising circuitry and/or routine(s) and operable according to principles disclosed herein. In some embodiments, the lens controller 334 and the lens drive mode manager 380 may be merged and/or indistinguishable. In various implementations, the VFL lens system (or imaging system) 300 may comprise a control system (e.g., the control system portion 120 of FIG. 2) that is configurable to operate in conjunction with the lens controller 334 to control the VFL (TAG) lens 370 via the signal line 334', by driving the VFL (TAG) lens 370 to periodically modulate its focus position. In various implementations, the lens controller 334 may operate to drive the VFL (TAG) lens 370 in two modes: in a standard imaging drive mode (or "imaging drive mode") in which the lens controller 334 drives the VFL (TAG) lens 370 using a standard imaging drive control configuration including a standard imaging drive voltage and a standard imaging drive duration; and in a regulating adaptive drive mode in which the lens controller 334 uses a regulating adaptive drive control configuration configured to provide at least one of a different (adjusted) TAG lens regulating drive voltage and a different (adjusted) TAG lens regulating drive duration to drive the VFL (TAG) lens 370, for reasons described in greater detail below.

The standard imaging drive control configuration is used during a plurality of imaging drive mode time periods. Each instance of the imaging drive mode time period provides image data acquired while operating the TAG lens 370 according to the standard imaging drive control configuration, which is defined to achieve a standard imaging state of the TAG lens (e.g., the same as the imaging drive control configuration used during calibration.) On the other hand, the regulating adaptive drive control configuration is used during a plurality of regulating adaptive drive mode time periods that are different from the imaging drive mode time periods. The regulating adaptive drive control configuration provides at least one of a different respective TAG lens regulating drive voltage and a different respective TAG lens regulating drive duration for different respective regulating adaptive drive mode time periods, which results in different respective rates of power dissipation or heating within the TAG lens for different respective regulating adaptive drive mode time periods.

The regulating adaptive drive control configuration is based on a TAG lens monitoring signal that is indicative of a difference between the standard imaging state of the TAG lens 370 and a current operating state of the TAG lens 370. For example, the TAG lens monitoring signal may be provided by a temperature sensor 336 associated with the TAG lens 370 to monitor an operating temperature of the TAG lens 370. As another example, the TAG lens monitoring signal may be provided by the drive signal generator portion 335 or any suitable sensing circuit that monitors an operating resonant frequency of the TAG lens 370 (e.g., as outlined previously.) In various implementations, the regulating adaptive drive control configuration is configured to compensate or reduce or eliminate the difference between the standard imaging state and the current operating state of the TAG lens 370 as indicated by the monitoring signal.

For example, when a TAG lens monitoring signal indicates an operating temperature of the TAG lens 370 lower than a defined (standard) temperature value, the regulating adaptive drive control configuration may be configured to provide a respective TAG lens regulating drive voltage that is greater than the standard imaging drive voltage for at least some of the respective regulating adaptive drive mode time periods. Alternatively, or additionally, the regulating adaptive drive control configuration may be configured to provide a respective TAG lens regulating drive duration that is longer than the standard imaging drive duration for at least some of the respective regulating adaptive drive mode time periods. Referring to FIG. 4, when a TAG lens monitoring signal indicates an operating resonant frequency of the TAG lens 370 higher than a defined (standard) resonant frequency, the regulating adaptive drive control configuration may be configured to increase the operating temperature of the TAG lens 370, which correspondingly lowers the operating resonant frequency of the TAG lens 370 to be closer to the defined (standard) resonant frequency of the TAG lens 370. For example, the regulating adaptive drive control configuration may provide a respective TAG lens regulating drive voltage that is greater than the standard imaging drive voltage and or a respective TAG lens regulating drive duration that is longer than the standard imaging drive duration for at least some of the respective regulating adaptive drive mode time periods in order to increase heating in the lens and raise its temperature and lower the operating resonant frequency of the TAG lens 370.

It will be appreciated that in the absence of a cooling system, the temperature of the TAG lens 370 will generally fluctuate with the ambient temperature, and will not be lower than the ambient temperature after a period of operation. Therefore, if a single standard operating temperature is to be chosen for use under all specified conditions, it must be chosen to be above the maximum allowed or specified environmental temperature range. Accordingly, in various implementations, a standard operating temperature of the TAG lens 370 is set greater than a maximum specified environmental (ambient) operating temperature of the TAG lens 370 or the imaging system 300. In order to achieve that standard temperature, when the ambient temperature is relatively low, relatively more heat must be generated in or around the lens. Conversely, when the ambient temperature is relatively high, less heat must be generated in or around the lens.

For example, when a specified environmental operating temperature of the TAG lens 370 or the imaging system 300 is in the range of 15 to 30 degrees C., by setting the standard operating temperature of the TAG lens 370 at an elevated temperature (e.g., 35 degrees C.) greater than the maximum specified environmental operating temperature (e.g., 30 degrees C.), more or less heat energy added by the regulating adaptive drive control configuration can always be used to correct (increase) the lens' operating temperature to meet its standard operating temperature.

According to various implementations, the TAG lens 370 may be insulated to reduce heat transfer between the TAG lens 370 and its environment. For example, a container of the fluid medium forming the TAG lens 370 may be made of or covered with a suitable heat-insulating material to reduce heat dissipation from the TAG lens 370 into the environment.

As shown in FIG. 3, the imaging system 300 may optionally include a lens heater 337 associated with the TAG lens 370. The lens heater 337 is configured to input an amount of heat energy into the TAG lens 370 to facilitate heating of the TAG lens 370 according to some implementations and/or operating conditions. The amount of heat energy provided by the heater 337 may be approximately fixed, at least for extended periods of lower ambient temperatures and/or lens temperatures. For example, it may be turned on below a temperature threshold value (e.g., below the middle of the specified ambient temperature range), and off above that value. In some implementations, the heat energy provided by the heater 337 may be nominally constant at all times of operation. The purpose of such a heater is simply to reduce the amount of heat energy that must be supplied and dissipated in the lens during the regulating adaptive drive mode time periods. The heater effect need not have a fast response time, or closed loop control, in various implementations. A simple, lost cost heating arrangements is possible in such cases. In some implementations, an ambient temperature may be sensed and the heater 337 may be driven according to a linear control profile that is a function of the ambient temperature so as to nominally make up for any reduction in the ambient temperature below the maximum specified ambient temperature. This allows for the regulating adaptive drive control configuration to essentially work within a constant compensation range (with regard to the energy it is required to dissipate into the TAG lens 370) regardless of the ambient temperature.

As previously indicated, in various implementations, a standard operating temperature of the TAG lens 370 is set greater than a maximum specified environmental (ambient) operating temperature of the TAG lens 370 or the imaging system 300. It will be understood that when the temperature of TAG lens 370 is relatively low compared to that standard temperature (and/or an operating resonant frequency of the TAG lens 370 is relatively higher than a standard frequency), in order to provide the desired stabilization, relatively more heat must be generated in the lens during corresponding regulating adaptive drive mode time periods. This may be achieved by using relatively higher drive voltages and/or a relatively longer drive duration, for example. Conversely, when the temperature of TAG lens 370 is relatively high compared to the standard temperature (and/or an operating resonant frequency of the TAG lens 370 is relatively lower than a standard frequency), in order to provide the desired stabilization, relatively less heat must be generated in the lens during corresponding regulating adaptive drive mode time periods. This may be achieved by using relatively lower drive voltages and/or relatively shorter drive duration. For example, under some conditions the regulating adaptive drive control configuration may provide a respective TAG lens regulating drive voltage that is lower than the standard imaging drive voltage and/or a respective TAG lens regulating drive duration that is shorter than the standard imaging drive duration for at least some of the respective regulating adaptive drive mode time periods. Under other conditions, for example when the temperature of TAG lens 370 sufficiently approaches or exceeds the standard temperature (and/or the operating resonant frequency of the TAG lens 370 approaches or falls below a standard frequency), the voltage and/or drive duration used during the regulating adaptive drive mode time periods may be set to zero (that is, no energy dissipation is provided under such conditions.)

The lens drive mode manager 380, which is responsible for driving the TAG lens 370 in the imaging drive mode and in the regulating adaptive drive mode, includes standard imaging drive mode circuits/routines 382 configured to control generation and transmission of the TAG lens drive signal via the signal line 334' to the TAG lens 370 during the imaging drive mode, and regulating adaptive drive mode circuits/routines 383 configured to control generation and transmission of the TAG lens drive signal via the signal line 334' to the TAG lens 370 during the regulating adaptive drive mode. In various exemplary embodiments, the lens controller 334 switches between the image mode and the regulating adaptive drive mode according to a defined schedule or in a predetermined sequence. For example, the imaging drive mode time periods and the regulating adaptive drive mode time periods may be interspersed in a predetermined sequence, as illustrated in FIG. 5 to be described in detail below. In one specific example, the predetermined sequence comprises alternating between the imaging drive mode time period and the regulating adaptive drive mode time period, as also shown in FIG. 5.

The regulating adaptive drive mode circuits/routines 383 may include a regulating adjustment circuit/routine 384 and a regulating monitor circuit/routine 385. In some implementations, the regulating adjustment circuit/routine 384 is configured to control generation and transmission of the TAG lens drive signal via the signal line 334' to the TAG lens 370 during the regulating adaptive drive mode time periods according to a predetermined sequence or schedule, as described above. In these implementations, the lens drive mode manager 380 may control switching between triggering the standard imaging drive mode circuits/routines 382 to enter the imaging drive mode and triggering the regulating adjustment circuit/routine 384 to enter the regulating adaptive drive mode according a predetermined sequence or schedule.

Figure 6:
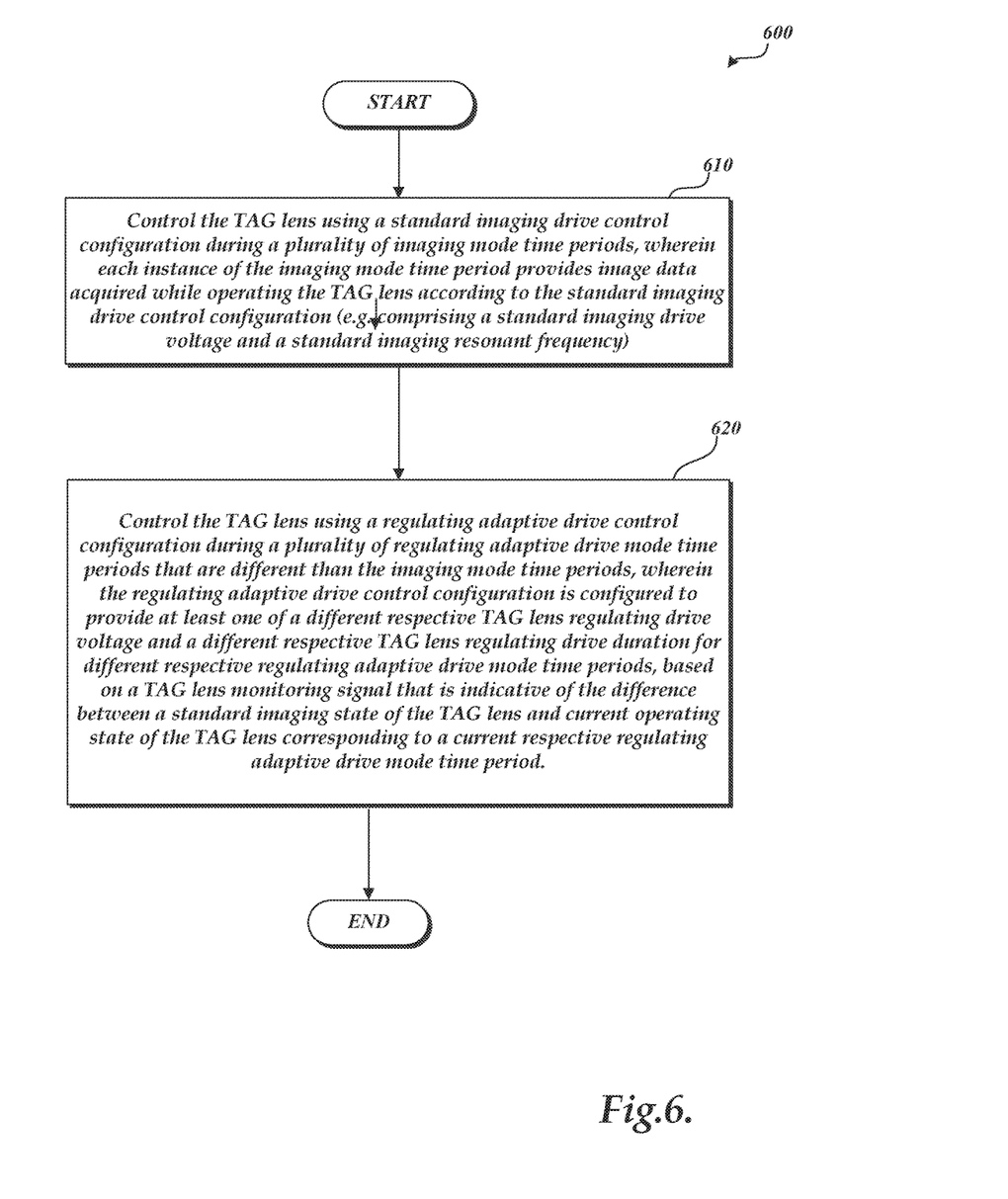
FIG. 6 is a flow diagram illustrating one exemplary implementation of a routine for operating an imaging system including a TAG lens.

FIG. 6 is a flow diagram illustrating one exemplary implementation of a routine 600 for operating the imaging system 300 to switch between the imaging drive mode and the regulating adaptive drive mode according to a predefined sequence or schedule. In step 610, the routine 600 controls the TAG lens 370, in the imaging drive mode, using a standard imaging drive control configuration during a plurality of imaging drive mode time periods. Each instance of the imaging drive mode time period provides image data acquired while operating the TAG lens 370 according to the standard imaging drive control configuration. The standard imaging drive control configuration includes a standard imaging drive voltage and a standard imaging drive duration and is configured to achieve a standard imaging state (e.g., a standard imaging resonant frequency and amplitude) of the TAG lens 370. In step 620, the routine 600 controls the TAG lens 370, in the regulating adaptive drive mode, using a regulating adaptive drive control configuration during a plurality of regulating adaptive drive mode time periods that are different than the imaging drive mode time periods. The regulating adaptive drive control configuration is configured to provide at least one of a different respective TAG lens regulating drive voltage and a different respective TAG lens regulating drive duration for different respective regulating adaptive drive mode time periods, based on a TAG lens monitoring signal that is indicative of a difference between the standard imaging state of the TAG lens 370 and a current operating state of the TAG lens 370. Note that, in step 620, the TAG lens monitoring signal is used to define the regulating adaptive drive control configuration (comprising a different regulating drive voltage and/or a different regulating drive duration) to drive the TAG lens 370, but the TAG lens monitoring signal is used as a basis for entering or not entering into the regulating adaptive drive mode. Rather, the routine 600 switches between entering the imaging drive mode (step 610) and entering the regulating adaptive drive mode (step 620) according to a predefined sequence or schedule.

Figure 7:
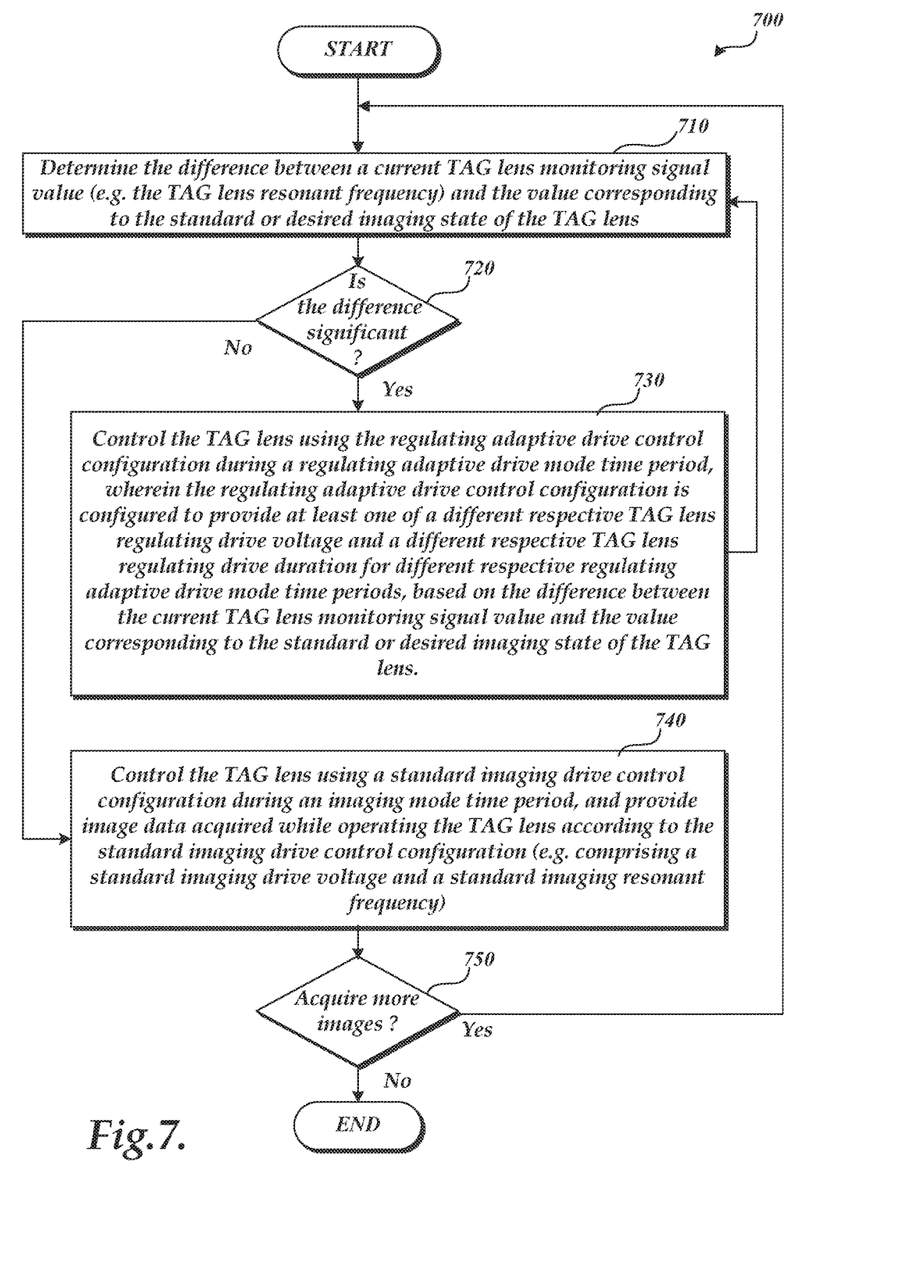
FIG. 7 is a flow diagram illustrating another exemplary implementation of a routine for operating an imaging system including a TAG lens.

FIG. 7 shows an alternative implementation, wherein the lens drive mode manager 380 controls switching between the imaging drive mode and the regulating adaptive drive mode based on a TAG lens monitoring signal meeting or exceeding a threshold value. For example, the lens drive mode manager 380 continues to drive the TAG lens 370 in the standard imaging drive mode as long as a difference between the standard imaging state of the TAG lens 370 and a current operating state of the TAG lens 370 (e.g., a deviation/drifting of the lens' operating temperature or operating resonant frequency) is below a threshold or within a threshold range (e.g., as indicated by a TAG lens monitoring signal value.) In response to the difference meeting or exceeding the threshold or threshold range, however, the lens drive mode manager 380 triggers the regulating monitor circuit/routine 385 to enter the regulating adaptive drive mode that uses a regulating adaptive drive control configuration including at least one of a different TAG lens regulating drive voltage and a different TAG lens regulating drive duration for a regulating adaptive drive mode time period.

For example, in FIG. 7, in step 710, a routine 700 determines the difference between a current TAG lens monitoring signal value (e.g., the TAG lens' operating resonant frequency) and the value corresponding to the standard or desired imaging state of the TAG lens (e.g., the lens' standard resonant frequency). If, in step 720, the routine 700 determines the difference to be not significant (e.g., not exceeding a threshold), then in step 740, the routine 700 remains in the standard imaging drive mode and controls the TAG lens 370 using a standard imaging drive control configuration during an imaging drive mode time period to provide image data acquired while operating the TAG lens 370 according to the standard imaging drive control configuration. If there are more images to be acquired (step 750), the routine 700 returns to steps 710 and 720 to again determine if the difference between a current TAG lens monitoring signal value and the value corresponding to the standard imaging state of the TAG lens 370 is significant.

If the routine 700 determines the difference to be significant (e.g., exceeding a threshold), then in step 730, the routine 700 enters the regulating adaptive drive mode and controls the TAG lens using a regulating adaptive drive control configuration during a regulating adaptive drive mode time period. The regulating adaptive drive control configuration is configured to provide at least one of a different TAG lens regulating drive voltage and a different TAG lens regulating drive duration for the regulating adaptive drive mode time period based on the difference between the current TAG lens monitoring signal value and the value corresponding to the standard or desired imaging state of the TAG lens 370. Thus, in the routine 700 of FIG. 7, the difference is used twice; first in step 720 to determine whether to remain in the imaging drive mode (step 740) or transition to the regulating adaptive drive mode (step 730), and second in step 730 to define the regulating adaptive drive control configuration (comprising a TAG lens regulating drive voltage and a TAG lens regulating drive duration) to compensate or correct for the difference.

From step 730, the routine 700 returns to steps 710 and 720 to again determine if the difference between a current TAG lens monitoring signal value and the value corresponding to the standard imaging state of the TAG lens 370 is significant, and continues as described above. In some cases, when the TAG lens operating state is relatively stabilized sufficiently close to the desired standard imaging state, the operations of step 740 may be performed several times without interruption by the operations of step 730. It will be appreciated that in some implementations, the imaging drive mode time periods may be further governed by a timing signal that ensures that they are timed to occur at a rate within a desired image acquisition rate range (e.g., 16 to 70 times per second, for example).

Returning to FIG. 3, in various implementations as described above, the TAG lens 370 may rapidly adjust or modulate the focus position periodically, to achieve a high-speed VFL lens capable of a periodic modulation (i.e., at a TAG lens resonant frequency) of 250 kHz, or 70 kHz, or 30 kHz, or the like. As shown in FIG. 3, by using the periodic modulation of a signal to drive the TAG lens 370, the focus position FP of the imaging system 300 may be (rapidly) moved within a range R (e.g., an autofocus search range) bound by a focus position FP1 and a focus position FP2.

In one implementation, the optional focus signal processing portion 375 (optional) may input data from the camera/detector 360 and may provide data or signals (focus monitoring signals, or FMSs) that are utilized to determine when an imaged surface region (e.g., of the workpiece 320) is at a focus position. For example, in an implementation where the camera/detector 360 includes a camera, one or more images acquired by the camera (e.g., an image stack), may be analyzed using a known "maximum contrast" analysis to determine when an imaged surface region of the workpiece 320 is at a focus position. In another implementation, the optical focus monitoring portion 376 (optional) may provide a focus monitoring signal (FMS), for example a signal from a photodetector, derived for image light 345 that passes through the VFL (TAG) lens 370 and is deflected from a beamsplitter 346' to the optical focus monitoring portion 376. In one embodiment, the optical focus monitoring portion 376 may comprise a confocal optical detector configuration. However, more generally any other suitable known focus detection configuration may be used.

In any case, the focus signal processing portion 375 or the optical focus monitoring portion 376 may input image light during the periodic modulation of the focus position (sweeping of multiple focus positions) of the VFL (TAG) lens 370 and output a corresponding focus monitoring signal (FMS) to the Z-height (focus distance) calibration portion 373. The Z-height calibration portion 373 may provide a Z-height (focus distance) versus FMS value characterization that relates respective Z-heights (focus distances) to respective FMS values indicative of images in focus. The Z-height calibration portion 373 may further provide Z-height (focus distance) calibration data that relates respective Z-heights (focus distances) to respective phase timings within a period of a standard imaging resonant frequency of the TAG lens 370, wherein the calibration data corresponds to operating the TAG lens 370 according to the standard imaging drive control configuration. Because the phase timings within a period of the TAG lens' standard imaging resonant frequency can be correlated to the FMS values or timings, the Z-height calibration data that relates respective Z-heights to respective phase timings can be derived from the Z-height versus FMS value characterization received from the focus signal processing portion 375 or the optical focus monitoring portion 376. Alternatively, the Z-height calibration data may be otherwise defined and stored in the Z-height calibration portion 373. Generally speaking, the Z-height calibration portion 373 comprises recorded Z-height calibration data. As such, its representation in FIG. 3 as a separate element is only schematic, and not limiting. The associated recorded Z-height calibration data could be merged with and/or indistinguishable from the lens controller 334, or the focus signal processing portion 375 or the optical focus monitoring portion 376, or a host computer system connected to the system signal and control bus 395, in various implementations.

The exposure (strobe) time controller 393 controls an image exposure time of the imaging system 300 (e.g., relative to a phase timing of the periodically modulated focus position) and may be merged with or indistinguishable from the camera/detector 360. Specifically, the exposure (strobe) time controller 393, using the Z-height calibration data available in the Z-height calibration portion 373, may control the light source 330 including a strobe light source to strobe at a respective controlled time. For example, the exposure (strobe) time controller 393 may control the strobe light source to strobe at a respective phase timing within a period of a standard imaging resonant frequency of the TAG lens 370, so as to acquire an image in best focus within the sweeping (periodic modulation) range of the TAG lens 370. In other implementations, the exposure time controller 393 may control a fast electronic camera shutter of the camera/detector 360 to acquire an image signal at a respective controlled time. For example, the exposure time controller 393 may control the camera shutter at a respective phase timing within the period of the standard imaging resonant frequency of the TAG lens 370 so as to acquire an image in best focus within the sweeping (periodic modulation) range of the TAG lens 370.

Generally, the exposure time controller 393 controls acquisition of image data by controlling an image exposure period during which the camera/detector 360 may capture an image of the workpiece 320. Thus, the exposure time controller 393 may control image acquisition so as to acquire image data only during the imaging drive mode, in which accurate inspection images of the workpiece 320 are expected, and not during the regulating adaptive drive mode, in which some deterioration of the image quality is expected due to an adjustment made to the drive signal of the TAG lens 370. That is, the exposure time controller 393 may prevent image exposure during the regulating adaptive drive mode to thereby prevent image acquisition during the regulating adaptive drive mode. For example, during the imaging drive mode, image data of the workpiece 320 may be acquired and displayed in a user interface of the imaging system 300 (see FIG. 2, display devices 136), while during the regulating adaptive drive mode image data is not acquired. In some implementations, image data may be acquired by the camera/detector 360 during the regulating adaptive drive mode but is not outputted by the imaging system 300.

In other implementations, image data may be acquired during the regulating adaptive drive mode. For example, image data acquired during the regulating adaptive drive mode, though the associated image quality and or measurement accuracy may be substandard, may still serve to provide "observational images" that are sufficient for an operator to continuously observe the workpiece 320 between the imaging drive mode and the regulating adaptive drive mode. In such a case the image data acquired during the regulating adaptive drive mode may be displayed also in the user interface of the imaging system 300.

FIG. 5 is a timing chart illustrating one exemplary operation of an imaging system including a TAG lens. FIG. 5 illustrates the relationship between the "Camera Exposure Timing" 500 during which image data may be acquired by the camera/detector 360, "Image Lighting" timing 502 used by the exposure (strobe) time controller 393 to turn on or off the lighting used for image exposure, "Difference in Monitored Signal" 503 indicative of a difference between the standard imaging state and a current operating state of the TAG lens 370, and "Drive Mode (Vpzt)" configuration 504 used to drive the TAG lens 370. With a high speed TAG lens having a rapid response time (<50 μs), switching or modulating between the two modes of operation (imaging drive mode and regulating adaptive drive mode) may be possible within the frame time of a typical camera/detector 360 (e.g., 16~32 frames/s), for example per half the frame time (e.g., 32-64 times per second).

FIG. 5 is a timing chart example of switching between the two modes according to a predetermined sequence, as described in the flow chart of FIG. 6. In the illustrated example, a plurality of imaging drive mode time periods 504A and a plurality of adaptive drive mode time periods 504B are interspersed in an alternative manner along the time axis. Before each of the imaging drive mode time periods 504A, a warm-up period (t1-t2, t6-t7, t12-t13, and t15-t16) may be provided. The warm-up period is provided to allow time for the TAG lens 370 to establish and re-establish stable optical operation (i.e., achieving a standard imaging state) before acquiring image data. For example, the warm-up period may correspond to 3 TAG lens cycles operating at a resonant frequency of 70 kHz.

In the imaging drive mode time periods 504A, a standard imaging drive control configuration is used, such that each instance of the imaging drive mode time period 504A provides image data acquired while operating the TAG lens 370 according to the standard imaging drive control configuration. In the illustrated example, the standard imaging drive control configuration includes a standard imaging drive voltage (e.g., 30 V or 30 Vpzt) and a standard imaging drive duration (e.g., t2-t3, t7(t2)-t8(t3), t13(t2)-t14(t3), and t16(t2)-t17(t3)) and is configured to achieve a standard imaging state of the TAG lens 370. The standard imaging drive duration may occur periodically at a rate of 16-70 times per second, in some implementations (although, this range of rates is exemplary only, and not limiting.) The exposure (strobe) time controller 393 turns on the image-exposure lighting (e.g., strobe lighting) of the imaging system 300 during a plurality of lighting exposure periods 502A that are synchronized with the imaging drive mode time periods 504A. Image data are acquired and integrated by the camera/detector 360 during a plurality of image integration periods 500A that are synchronized with the lighting exposure periods 502A and with the imaging drive mode time periods 504A. In various implementations, the acquired image data is displayed in a user interface of the imaging system 300.

In the regulating adaptive drive mode time periods 504B, a regulating adaptive drive control configuration is used which provides at least one of a different respective TAG lens regulating drive voltage and a different respective TAG lens regulating drive duration for different respective regulating adaptive drive mode time periods 504B, based on a TAG lens monitoring signal that is indicative of a difference between the standard imaging state and a current operating state of the TAG lens 370. For example, the lens controller 334 uses a TAG lens monitoring signal that monitors an operating resonant frequency and/or an operating temperature of the TAG lens 370. The TAG lens monitoring signal is indicative of a current operating state of the TAG lens 370 and, thus, may be obtained prior to, or in correspondence with, the current regulating adaptive drive mode time period 504B. For example, a regulating adaptive drive control configuration applied in the regulating adaptive drive mode time period 504B between t3 and t6 may be based on the TAG lens monitoring signal obtained prior to t3, such as between t2 and t3, between t1 and t2, etc.

In the illustrated example, during the first regulating adaptive drive mode time period 504B between t3 and t6, TAG lens regulating drive voltage dA1 (e.g., 40 V) is used between t3 and t4, TAG lens regulating drive voltage dA2 (e.g., 30 V) lower than dA1 is used between t4 and t5, and TAG lens regulating drive voltage dA3 (e.g., 20V) lower than dA2 is used between t5 and t6. Periods between t3 and t4, between t4 and t5, and between t5 and t6 may be considered as respectively constituting regulating adaptive drive mode time periods or as collectively constituting the regulating adaptive drive mode time period 504B between t3 and t6. The regulating adaptive drive control configuration applied in the first regulating adaptive drive mode time period 504B between t3 and t6 has an energy dissipation level "A" as graphically illustrated in FIG. 5. The regulating adaptive drive control configuration is based on a TAG lens monitoring signal that is obtained prior to, or in correspondence with, the current regulating adaptive drive mode time period 504B between t3 and t6, and that indicates the difference 503 between the standard imaging state and a current operating state of the TAG lens 370.

During the "second" regulating adaptive drive mode time period 504B between t8(t3) and t12(t6), TAG lens regulating drive voltage dB1 (e.g., 40 V) is used between t8(t3) and t9, TAG lens regulating drive voltage dB2 (e.g., 30 V) lower than dB1 is used between t9 and t10, and TAG lens regulating drive voltage dB3 (e.g., 20V) lower than dB2 is used between t10 and t11. No voltage (V=0) is applied between t11 and t12(t6). Periods between t8(t3) and t9, between t9 and t10, between t10 and t11, and between t11 and t12(t6) may be considered as respectively constituting regulating adaptive drive mode time periods or as collectively constituting the regulating adaptive drive mode time period 504B between t8(t3) and t12(t6). The regulating adaptive drive control configuration applied in the second regulating adaptive drive mode time period 504B between t8(t3) and t12(t6) has an energy dissipation level "B" as graphically illustrated in FIG. 5. The regulating adaptive drive control configuration is based on a TAG lens monitoring signal that is obtained prior to, or in correspondence with, the current regulating adaptive drive mode time period 504B between t8(t3) and t12(t6) and that indicates the difference 503 between the standard imaging state and a current operating state of the TAG lens 370. In the illustrated embodiment, the energy dissipation level "B" of the current regulating adaptive drive mode time period 504B between t8(t3) and t12(t6) is different from, or adjusted from, the energy dissipation level "A" of the previous (first) regulating adaptive drive mode time period 504B between t3 and t6.

During the "third" regulating adaptive drive mode time period 504B between t14(t3) and t15(t6), TAG lens regulating drive voltage dC1 (e.g., 40 V) is applied, which is the highest voltage usable to drive the TAG lens 370 in the illustrated example. The regulating adaptive drive control configuration has an energy dissipation level "C" during the current regulating adaptive drive mode time period 504B between t14(t3) and t15(t6) as illustrated in FIG. 5. The regulating adaptive drive control configuration is based on a TAG lens monitoring signal that is obtained prior to, or in correspondence with, the current regulating adaptive drive mode time period 504B between t14(t3) and t15(t6) and that indicates the difference 503 between the standard imaging state and a current operating state of the TAG lens 370. In the illustrated example, the difference 503 indicates a sudden increase in the operating resonant frequency of the TAG lens 370 or a corresponding sudden decrease in the operating temperature and/or the environmental (ambient) temperature of the TAG lens 370, as designated by 503'. Thus, the energy dissipation level "C" of the regulating adaptive drive control configuration to be applied between t14(t3) and t15(t6) is configured to input more heat energy to the TAG lens 370, compared to the energy dissipation levels "A" and "B" applied in the previous regulating adaptive drive mode time periods 504B between t3 and t6 and between t8(t3) and t12(t6), to compensate for the sudden change.

During the "fourth" regulating adaptive drive mode time period 504B between t17(t3) and t18(t6) (not shown), no voltage dD1 (=0 V) is applied. The regulating adaptive drive control configuration has an energy dissipation level "D" during the current regulating adaptive drive mode time period 504B between t17(t3) and t18(t6) as illustrated in FIG. 5. The regulating adaptive drive control configuration is based on a TAG lens monitoring signal that is obtained prior to, or in correspondence with, the current regulating adaptive drive mode time period 504B between t17(t3) and t18(t6) and that indicates the difference 503 between the standard imaging state and a current operating state of the TAG lens 370. In the illustrated example, the regulating adaptive drive control configuration applied in the previous regulating adaptive drive mode time period 504B between t14(t3) and t15(t6) was effective in lowering/decreasing the difference 503 (by increasing the operating temperature of the TAG lens 370), as also illustrated in FIG. 5. Thus, the energy dissipation level "D" of the regulating adaptive drive control configuration to be applied between t17(t3) and t18(t6) is configured to input "no" additional heat energy to the TAG lens 370, which is different from any of the energy dissipation levels "A," "B" and "C" applied in the previous regulating adaptive drive mode time periods 504B between t3 and t6, between t8(t3) and t12(t6), and between t14(t3) and t15(t6).

The regulating adaptive drive control configuration provides at least one of a different respective TAG lens regulating drive voltage and a different respective TAG lens regulating drive duration for different respective regulating adaptive drive mode time periods 504B so as to establish or maintain the TAG lens 370 at its standard imaging state (e.g., a standard operating resonant frequency or a standard operating temperature). In various implementations, the exposure (strobe) time controller 393 may turn off the image-exposure lighting (e.g., strobe lighting) of the imaging system 300 during a plurality of lighting exposure periods 502B that are synchronized with the regulating adaptive drive mode time periods 504B. In some implementations, image data may be acquired and integrated by the camera/detector 360 during a plurality of image integration periods 500B that are synchronized with the lighting exposure periods 502B and with the regulating adaptive drive mode time periods 504B. The acquired data may be presented as observational images in a user interface of the imaging system 300. In other implementations, image data are not acquired and integrated during the plurality of image integration periods 500B, or an output of acquired images may be prevented during the plurality of image integration periods 500B.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method of operating an imaging system comprising a tunable acoustic gradient (TAG) lens, a TAG lens controller, a camera, and an exposure time controller, in order to establish or maintain the TAG lens at a desired operating state for imaging, the method comprising:
controlling the TAG lens using a standard imaging drive control configuration during a plurality of imaging drive mode time periods, wherein each instance of the imaging drive mode time period provides image data acquired while operating the TAG lens according to the standard imaging drive control configuration, wherein the standard imaging drive control configuration includes a standard imaging drive voltage and a standard imaging drive duration and is configured to achieve a standard imaging state of the TAG lens; and
controlling the TAG lens using a regulating adaptive drive control configuration during a plurality of regulating adaptive drive mode time periods that are different from the imaging drive mode time periods, wherein the regulating adaptive drive control configuration is configured to provide at least one of a different respective TAG lens regulating drive voltage and a different respective TAG lens regulating drive duration for different respective regulating adaptive drive mode time periods, based on a TAG lens monitoring signal that is indicative of a difference between the standard imaging state of the TAG lens and a current operating state of the TAG lens.

2. The method of claim 1, wherein the imaging drive mode time periods and the regulating adaptive drive mode time periods are interspersed in a predetermined sequence.

3. The method of claim 2, wherein the predetermined sequence comprises alternating between the imaging drive mode time period and the regulating adaptive drive mode time period.

4. The method of claim 1, wherein the monitoring signal monitors an operating resonant frequency of the TAG lens.

5. The method of claim 1, wherein the monitoring signal monitors an operating temperature of the TAG lens.

6. The method of claim 1, wherein the standard imaging state of the TAG lens comprises an operating temperature of the TAG lens that is greater than a maximum specified environmental operating temperature of the TAG lens or of the imaging system.

7. The method of claim 6, wherein the TAG lens is insulated to reduce heat dissipation to an environment.

8. The method of claim 1, wherein the regulating adaptive drive control configuration is configured to provide a respective TAG lens regulating drive voltage that is greater than the standard imaging drive voltage for at least some of the respective regulating adaptive drive mode time periods.

9. The method of claim 1, wherein the TAG lens comprises a heater that inputs an amount of heat energy into the TAG lens, wherein the amount of heat energy is approximately fixed for at least some of the plurality of regulating adaptive drive mode time periods.

10. The method of claim 9, wherein the amount of heat energy is nominally constant at all times of operation.

11. The method of claim 1, wherein the imaging system comprises Z-height (focus distance) calibration data that relates respective Z-heights (focus distances) to respective phase timings within a period of a standard imaging resonant frequency of the TAG lens, wherein the calibration data corresponds to operating the TAG lens according to the standard imaging drive control configuration.

12. The method of claim 1, comprising:
acquiring observational images during the regulating adaptive drive mode time periods and displaying the acquired observational images in a user interface of the imaging system.

13. The method of claim 1, comprising:
not acquiring images during the regulating adaptive drive mode time periods, or
suppressing an output of images acquired during the regulating adaptive drive mode time periods.

14. The method of claim 1, comprising:
in response to the difference between the standard imaging state of the TAG lens and the current operating state of the TAG lens exceeding a threshold, transitioning from controlling the TAG lens using the standard imaging drive control configuration to controlling the TAG lens using the regulating adaptive drive control configuration, and
in response to the difference not exceeding the threshold, continuing controlling the TAG lens using the standard imaging drive control configuration.

15. An imaging system, comprising:
a camera,
an exposure time controller configured to control image data acquisition by the camera,
a tunable acoustic gradient (TAG) lens, and
a TAG lens controller which, in operation,
controls the TAG lens using a standard imaging drive control configuration during a plurality of imaging drive mode time periods, wherein each instance of the imaging drive mode time period provides image data while operating the TAG lens according to the standard imaging drive control configuration, wherein the standard imaging drive control configuration includes a standard imaging drive voltage and a standard imaging drive duration and is configured to achieve a standard imaging state of the TAG lens; and controls the TAG lens using a regulating adaptive drive control configuration during a plurality of regulating adaptive drive mode time periods that are different from the imaging drive mode time periods, wherein the regulating adaptive drive control configuration is configured to provide at least one of a different respective TAG lens regulating drive voltage and a different respective TAG lens regulating drive duration for different respective regulating adaptive drive mode time periods, based on a TAG lens monitoring signal that is indicative of a difference between the standard imaging state of the TAG lens and a current operating state of the TAG lens.

16. The imaging system of claim 15, wherein the exposure time controller comprises a circuit that controls a strobe light source of the imaging system to strobe at a respective controlled time.

17. The imaging system of claim 16, further comprising Z-height (focus distance) calibration data that relates respective Z-heights (focus distances) to respective phase timings within a period of a standard imaging resonant frequency of the TAG lens, the calibration data corresponding to operating the TAG lens according to the standard imaging drive control configuration, wherein the exposure time controller controls the strobe light source of the imaging system to strobe at a respective controlled time corresponding to a respective phase timing within the period of the standard imaging resonant frequency.

18. The imaging system of claim 15, wherein the exposure time controller comprises a circuit that controls a camera shutter to acquire an image signal at a respective controlled time.

19. The imaging system of claim 15, comprising a heater arranged to input an amount of heat energy into the TAG lens, wherein the amount of heat energy is approximately fixed for at least some of the plurality of regulating adaptive drive mode time periods.

20. The imaging system of claim 15, wherein, the exposure time controller prevents image exposure during the regulating adaptive drive mode time periods, or the imaging system suppresses an image display of image data acquired by the camera during the regulating adaptive drive mode time periods.

* * * * *